(12) United States Patent
Anzai et al.

(10) Patent No.: US 6,659,759 B2
(45) Date of Patent: Dec. 9, 2003

(54) APPARATUS FOR THE PRODUCTION OF A RECORDING MEDIUM

(75) Inventors: Yumiko Anzai, Ome (JP); Motoyasu Terao, Hinode (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 10/083,256

(22) Filed: Feb. 27, 2002

(65) Prior Publication Data

US 2003/0099736 A1 May 29, 2003

(30) Foreign Application Priority Data

Oct. 25, 2001 (JP) .................................... 2001-327115

(51) Int. Cl.$^7$ ............................................. B29D 11/00
(52) U.S. Cl. ..................... 425/515; 425/518; 425/520; 425/174.4; 425/436 R; 425/394; 425/396; 425/810
(58) Field of Search ............................. 425/174.4, 394, 425/396, 436 R, 436 RM, 515, 518, 520, 810; 264/106, 107, 336; 156/220

(56) References Cited

U.S. PATENT DOCUMENTS

| 5,135,376 A | * | 8/1992 | Watanabe et al. ............ 425/110 |
| 5,480,596 A | * | 1/1996 | Okubo et al. ................ 264/1.33 |
| 6,280,661 B1 | * | 8/2001 | Takakuwa et al. .......... 264/1.33 |
| 6,354,827 B1 | * | 3/2002 | Kerfeld ......................... 425/195 |

FOREIGN PATENT DOCUMENTS

| JP | 8-297861 | 11/1996 |
| JP | 9-73671 | 3/1997 |
| JP | 2000-36165 | 2/2000 |

* cited by examiner

*Primary Examiner*—James P. Mackey
*Assistant Examiner*—Donald Heckenberg
(74) *Attorney, Agent, or Firm*—Antonelli, Terry, Stout & Kraus, LLP

(57) ABSTRACT

A sheet used as a spacer layer is made of photo-curing organic material and thermoplastic organic material, a stamper is pressed on the sheet, and light irradiating is performed after the stamper is stripped.

6 Claims, 16 Drawing Sheets

APPARATUS FOR THE PRODUCTION OF A RECORDING MEDIUM

BACKGROUND OF THE INVENTION

1. Field of the Invention

The present invention relates to an optical disk, which is used in a recording and regenerating apparatus beyond NA O. 7, and on which multiple information layers of an optical disk medium is formed, in the optical disk medium used for each of various optical disk apparatuses such as DVD-ROM, DVD-RAM, and DVD-RW.

2. Description of the Related Art

A production method of a conventional optical disk substrate will be described. A plastic substrate on whose surface a concavo-convex pattern is reproduced is completed by injecting plastic substrate material (for example, polycarbonate etc.), which is dissolved at high temperature, in high pressure into a die equipped with a metal stamper, cooling the plastic substrate material, and taking out it. This technique is a present common production technique (injection molding method) of plastic substrates used for CD-Audio, CD-R, CD-ROM, DVD-ROM, DVD-R, DVD-RAM, DVD-RW, MO, etc. Then, a medium is formed by forming a reflective layer or a recording stacked layer on a surface of the concavo-convex pattern by sputtering as a signal-recording surface, and forming a protection layer with a UV cure resin so as to protect the signal-recording surface so that the signal-recording surface may not be damaged.

As means for higher densification, the enlargement of numerical aperture (NA) of a stop down lens and multiple stacking of a recording layer are mentioned. The multi-layer optical recording medium is shown in JP-A-8-297861. This is a multi-layer optical recording medium with large capacity that has two recording layers respectively on a plurality of substrates whose recording media are different from each other, that has the structure where substrates with two-layer recording layers are laminated so that their recording layers may face each other, and that has sufficient record and reproduction characteristics.

Since what is difficult in the case of multi-layer production is to produce uniform intervals (hereafter, thickness of a spacer layer) between layers, it is indispensable to make a substrate, which is in a light-incident side, thinner than 0.6 mm when the NA of a lens is large. In that case, it is difficult to transfer a concavo-convex pattern from a stamper on a substrate in the light-incident side and to form recording stacked layers sequentially on it, like a conventional way. It is because the substrate may be curled due to the stress caused by the formation of the recording stacked layer. Therefore, it is necessary to also transfer the pattern on a surface of the spacer layer and to form the recording stacked layer on it.

As for a production method of a spacer layer, a method of forming the spacer layer with an ultraviolet cure resin by a spin coating method is shown in JP-A-9-73671. A spin coating method is a method of dropping liquid from a nozzle, diffusing the liquid by rotation, and forming a layer. Here, the spacer layer is cured by irradiating the spacer layer with ultraviolet spot light with interlocking with the forming operation of the spacer layer and moving toward a peripheral side from a center of rotation. In addition, another production method of a spacer layer is shown in JP-A-2000-36165 as an example of using a dry photopolymer sheet. A dry photopolymer consists of a polymer, whose functional groups absorb light and react. Here, the production method of a spacer layer is mentioned, the method comprising the steps of placing a resin on a stamper, pressing a sheet with the stamper, transferring a signal, performing UV irradiation to the sheet with the stamper, curing the resin, and stripping the stamper.

As for a production method of a spacer layer, JP-A-9-73671 shows a method of forming the spacer layer with an ultraviolet cure resin by a spin coating method. Nevertheless, for example, when producing a disk with a diameter of 120 mm with this method, the thinner the spacer layer becomes due to shortening of wavelength or achievement of higher NA, the easier the disk is affected by the curvature of a substrate etc., and hence, it is difficult to decrease the dispersion of thickness of the spacer layer. In addition, in an example of using a dry photopolymer sheet in JP-A-2000-36165, it is described that, when a resin layer is heated, the entanglement of a portion where carbon atoms of a polymer lie in a long chain loosens, and hence the resin layer becomes soft to some extent. However, if the extent of this softening is enlarged, thickness becomes uneven when a pattern is transferred with pressing a sheet with a stamper, and when stripping the stamper after transfer as it is, the transferred pattern is collapsed by an adhesion force or the friction in a ramp of the pattern. On the other hand, if the extent of softening is decreased, there is a problem that transfer property is bad since the resin does not go into concavities of the stamper.

Examples of a case where the transfer property is good and a case where the transfer property is poor are shown in FIGS. 16 and 17. Since ROM (read only memory) differs in the geometry of a pattern from RAM (random access memory), each is shown. Since a thermoplastic organic material is softened by heating a sheet when the sheet is pressed against a stamper, the thermoplastic organic material is filled into the details of a stamper pattern, and hence, the concavo-convex pattern of the stamper is faithfully transferred by stripping the stamper after curing. When filling in this case is inadequate, it causes the lack of a pattern, and hence, transfer is unsuccessful.

An object of the present invention is to attain further high densification for producing a spacer layer with good pattern transcription.

SUMMARY OF THE INVENTION

The above-described issues are solved by the following methods.

(1) A production method of a spacer layer will be described. This method comprises the steps of forming a first recording stacked layer on a substrate, and heating a sheet with sandwiching the sheet, made by mixing photo-curing organic material with thermoplastic organic material, between the first recording stacked layer and the stamper for pattern transfer to transfer a pattern of the stamper to the sheet. The stamper is stripped after pattern transfer, and after that, light is radiated on the sheet. When photo-curing organic material and thermoplastic organic material softened by heating are mixed, the fundamental geometry, i.e., thickness, of a resin layer is maintained by the photo-curing organic material when the resin layer is heated, and the thermoplastic organic material distributed inside the resin layer in a granular or braided shape is remarkably softened, and hence, it becomes easy to transfer the concavo-convex pattern of the stamper by surface deformation. In photo-curing organic material, there are cationic polymerization type material that gradually performs curing reaction when light is radiated, and another type material that is cured immediately after light is radiated. When a reaction rate is slow, light irradiating is performed before pattern transfer to a spacer layer as a pattern for a second layer, and when a reaction rate is fast, light irradiating is performed after pattern transfer. Photoresistive organic material comprises, for example, a resin and a cationic initiator, and as examples of this type of resins, a cycloaliphatic epoxy resin, a bisphenol A type epoxy resin, a bisphenol F type epoxy resin, a phenol novolak type epoxy resin, a vinyl ether compound, an acrylic resin, etc. are mentioned. Photopolymerization initiators are, for example, benzoin, benzoin butyl ether, benzoin isopropyl ether, benzophenone, benzaldehyde, benzyl, benzoin ethyl ether, benzyl dimethyl ketal, xanthone, thio-xanthone, azobisisobutyronitril, benzoyl peroxide, a benzophenone/amine system. Mixing ratio is 0.01 to 10 wt % of cationic initiator to each resin. And photopolymerization initiators (photochemical sensitizers) commonly known are mentioned, whose mixing ratio is 0.1 to 5% to each resin. As thermoplastic resins, for example, a phenoxy resin, a polyvinyl acetate resin, a vinyl butyral resin, an acrylic resin, a polyvinyl chloride, a vinyl chloride copolymer, polyvinyl alcohol, a cyano acrylic ester system, a nitrocellulose system, polyyne butylene, polyvinyl ether, acrylic ester, polyvinyl pyrrolidone, polyolefine, polypropylene, nylon, polytetrafluoroethylene, etc. are mentioned. It is still more preferable if a thermoplastic resin is also polymerized by light irradiating and a molecular weight increases.

(2) In addition, another production method of a spacer layer will be described. This method comprises the steps of forming a first recording stacked layer on a substrate, and heating a sheet with sandwiching the sheet, made by mixing thermosetting organic material with thermoplastic organic material, between the first recording stacked layer and the stamper for pattern transfer to transfer a pattern of the stamper to the sheet. The stamper is stripped after pattern transfer, and after that, the sheet is heated. When thermoplastic organic material of excellent property in mass production by conventional injection molding is used for a spacer layer of a multi-layer recording medium, the material may be changed with the heat of a recording laser beam. In order to prevent the change, it is good to mix thermosetting organic material that performs bridge-forming reaction and is cured with heat. This is because there is no heat deformation after complete curing. In thermosetting organic material, there are cationic polymerization type material that gradually performs bridge-forming and cures when heat is applied, and material is cured immediately after heat is applied. A resin similar to a thermoplastic resin mentioned in item (1) can be used. As for thermosetting organic material, phenol resin, resorcinol resin, phenol resorcinol resin, urea resin, polyester, epoxy resin, polyisocyanate, a silicone resin, acrylic resin, acrylic acid diester resin, melamine resin, etc. are mentioned. In addition, mixtures of respective polyvinyl acetal, polyvinyl butyral, polyvinyl formal, nylon, neoprene resin, etc. to respective phenolic resins, and mixtures of respective cationic initiators to these respective resins, whose mixing ratio is 0.01 to 10 wt % to each resin, are mentioned.

(3) Furthermore, still another production method of a spacer layer will be described. The method comprises the steps of forming a first recording stacked layer on a substrate, and placing thereon a sheet that is made by mixing photo-curing organic material and thermosoftening-then-setting organic material whose molecular weights are different by 5 or more times, and more preferably, 50 to 100 times, radiating light, and transferring a pattern of a stamper on a sheet with sandwiching the sheet between the substrate and stamper and heating the sheet. Subsequent steps are steps of stripping the stamper after pattern transfer, and radiating light on the sheet thereafter. Thermosoftening-then-setting organic material is softened at a first temperature and self cured after the softening, and the concept of the thermosetting organic material described in item (2) includes the thermosoftening-then-setting organic material. An epoxy resin is mentioned as a typical example. Although the thermosoftening-then-setting resin is excellent in thermal stability after curing, since high reaction temperature becomes a process problem, it is also preferable to enhance a reaction efficiency by adding a photopolymerizing component. As shown in FIG. 12, when small molecules are made to enter into gaps between large molecules, it is possible to maintain fundamental geometry, that is, thickness with large molecules and to have further excellent film uniformity because small molecules are dispersed in a granular or brained shape. For example, when the molecular weight of the thermosoftening and thermosetting material is large, fundamental thickness is maintained although the material becomes soft with heat, and photo-curing organic material with the small molecular weight distributed in the gaps perform curing reaction by light irradiating to be firmly solidified. When there is no difference between molecular weights, the thickness uniformity or transcription becomes bad. However, if one of the two molecular weights is too large, dispersion becomes nonuniform and the sheet is only partially softened even if heat is applied. Thermosetting organic material similar to that described in item (2) can be used as the thermosoftening and thermosetting organic material, and photo-curing organic material the same as that described in item (1) can be used as the photo-curing organic material.

(4) In addition, the sheet material in item (1) is characterized in that, when a softening degree of thermoplastic organic material is larger than that of photo-curing organic material, it is more preferable that a content of thermoplastic organic material in a side far from the substrate is larger than that in a side near the substrate. It is desirable that, when a pattern for the second layer is produced for a multi-layer recording medium, a resin in a stamper side is more thermosoftening, because more faithful pattern transfer from a stamper such as a Ni stamper becomes possible.

(5) In addition, the sheet material in item (1) is characterized in that, when a softening degree of photo-curing organic material is larger than that of thermoplastic organic material, a content of thermoplastic organic material in a side near the substrate is larger than that in a side far from the substrate. It is desirable that, when a pattern for the second layer is produced for a multi-layer recording medium, a resin in a stamper side is more thermosoftening because more faithful pattern transfer from a stamper such as a Ni stamper becomes possible.

(6) This is characterized in that each spacer layer mentioned in items (1), (2), and (3) has light transmission of 90% or more in wavelengths of 390 to 415 nm. This is because, when record and reproduction are performed with radiating a laser beam, both of the spacer layer and a cover layer become optical transmission layers. In addition, also in the case that the above-described sheet comprises a resin layer and a transparent base sheet, it is desirable that the light transmission of the resin and transparent base is high at a wavelength of 405 nm. The desirable material of the transparent base is polycarbonate or polyolefine. Since the beam is absorbed in both ways of incidence and reflection when a laser beam is incident into the spacer layer, high transmission is desirable. If the transmission is 89% or less, influences such as a signal error rate increase caused by a small amounts of reflected light arise.

In addition, in the case that the sheet comprises a resin and a transparent base, it is desirable that the square of the difference between a refraction indice of the resin and that of the transparent base sheet is $\frac{1}{150}$ or less. Since the sheet is used for a transparency layer of a multi-layer recording medium, a laser beam goes back and forth the first recording stacked layer and second recording stacked layer. Hence, it is desirable that the refraction indices of the above-described resin and the above-described transparent base are about the same. This is because optical interference exerts a bad influence.

Owing to these, it was succeeded to experimentally produce a recording medium for a super-large capacity optical disk digital video recorder with a capacity of 40 GB or more and a recording medium for an optical disk digital camcorder with a capacity of 4 GB or more.

(7) Case of Light Irradiating:

An apparatus which forms a second recording stacked layer sequentially on the first recording stacked layer will be described by using FIG. 2, and process steps thereof will be described by using FIG. 8. This apparatus has the configuration that a stripping part 17 of a stamper is provided between a heating and pressing part 21 for transferring a pattern on a sheet and a light irradiating part 16 that cures the sheet. This part presses the sheet with melting the sheet by heating. Then, heat sources such as a roller and a heater that are heated at high temperature are mentioned as heating means, and a roller, pneumatics, and a tool with stamp geometry are mentioned as pressure means. In addition, as for light irradiating means, when wavelengths to which an optical curing agent reacts are within UV, UV light sources to be used are a metal halide lamp, a low-pressure mercury lamp, and a high-pressure mercury vapor lamp. A holder of the stamper stripping part has a mechanism raising the stamper with bending the stamper, and is equipped with a magnet chuck 9 for stripping. In addition, besides a colored stamper like a Ni stamper, the stamper can be made of polyolefine and the like that are transparent. On the other hand, JP-A-2000-36165 describes an example that a sheet is softened by heat, UV emission is performed with the sheet being pressed with the stamper, and the stamper is removed thereafter. However, in the colored stamper such as the Ni stamper, since UV light is interrupted by the stamper with the stamper being pressed, the UV light cannot be adequately radiated on the sheet. Here, in the method of the present invention, since light irradiating is performed after the stamper being stripped, the stamper does not interrupt the UV light. In addition, according to JP-A-2000-36165, since the stamper is removed after radiating UV light, the stamper is removed after a sheet is completely solidified, and hence, not only it is difficult to remove the stamper with maintaining transcription, but also stress causes a crack. On the other hand, according to the present invention, since the stamper is removed before a sheet is completely cured, not only it is possible to prevent a crack from arising due to stress, but also it is possible to obtain good transcription.

(8) Case of Heating:

An apparatus which forms a second recording stacked layer sequentially on the first recording stacked layer will be described by using FIG. 3, and process steps thereof will be described by using FIG. 9. This apparatus has the configuration that a stripping part 17 of a stamper is provided between a heating and pressing part 21 for transferring a pattern on a sheet and a heating part 18 that cures the sheet. At the same time when becoming soft by being heated, a thermoplastic resin is filled up over the details of a stamper pattern by being pressed. Furthermore, the sheet becomes cured as temperature falls, and simultaneously, curing reaction by heat also occurs. Since the stamper is easily removed before the sheet is completely cured, it is possible to prevent a crack from arising due to stress. In addition, since the pattern deformation does not arise at the time of stripping the stamper, transfer is excellent. Furthermore, after a stamper is stripped, the sheet is heated by the heating part 18 and is completely cured.

(9) Case of Optical Re-emission After Heating After Light Irradiating:

An apparatus which forms a second recording stacked layer sequentially on the first recording stacked layer will be described by using FIG. 4, and process steps thereof will be described by using FIG. 10. The apparatus comprises a light irradiating part 19 for facilitating a thermal reaction, a heating and pressing part 21 for transferring a pattern on the sheet, a stripping part 17 of a stamper, and a light irradiating part 20 that finally cures the sheet. It is made the thermal reaction to easily arise by first light irradiating, a reaction gradually progresses by temperature rising by the heating part, and a thermosoftening and thermosetting resin which becomes soft is filled over the details of the stamper pattern by the pressing part. Furthermore, the sheet which becomes cured by temperature rising is stripped before being completely cured, and is further completely cured thereafter by light irradiating.

DETAILED DESCRIPTION OF THE PREFERRED EMBODIMENTS

Hereafter, an example of an embodiment of the present invention will be described.

[Embodiment 1]

Figure 1:
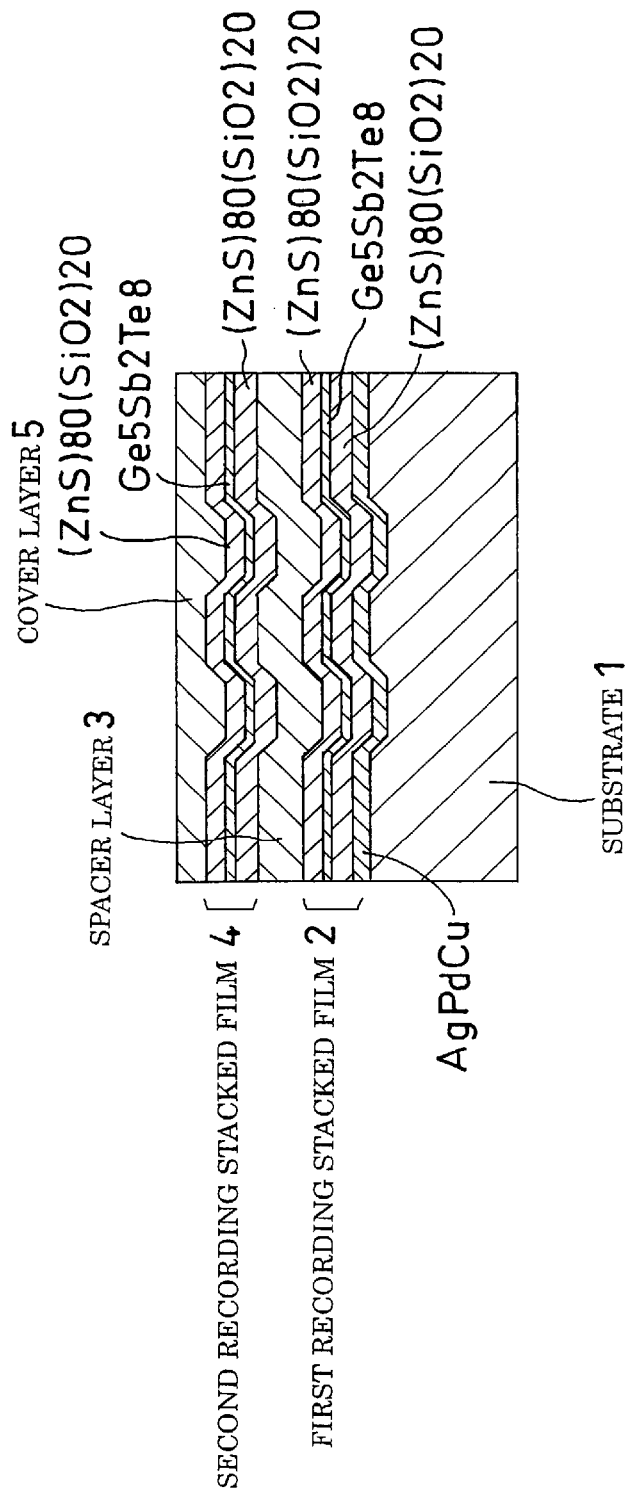
FIG. 1 is a structural diagram of a two-layer recording medium according to an embodiment of the present invention.
Figure 2:
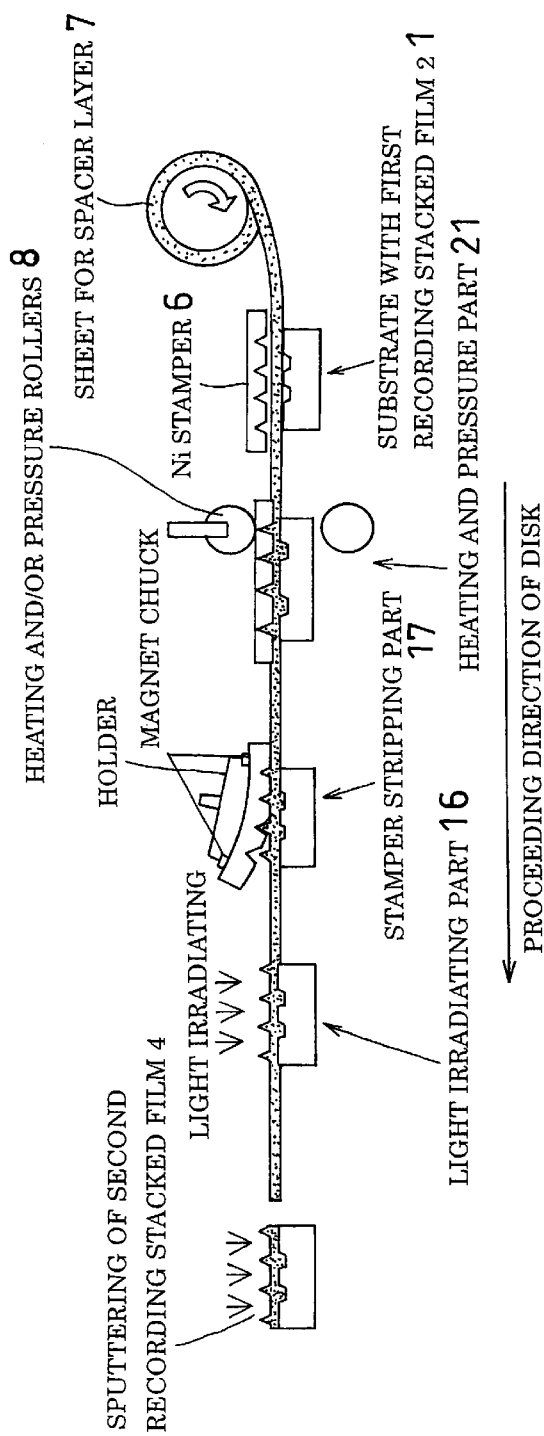
FIG. 2 shows a production method of a spacer layer of a two-layer recording medium according to an embodiment of the present invention.

FIG. 1 shows the configuration of a fundamental recording medium of a two-layer recording medium according to the present invention. The two-layer recording medium comprises a substrate 1 with a first pattern produced by an injection method, a first recording stacked layer 2, a spacer layer 3 with a second pattern, a second recording stacked layer 4, and a cover layer 5. As an example, a production method of a multi-layer rewritable recording medium which forms a second recording stacked layer sequentially on a first recording stacked layer will be described. As shown in FIG. 2, a first recording stacked layer 2 is stacked beforehand by sputtering to a face of a substrate 1 in which a concavo-convex pattern such as a pit and a groove are formed, a sheet 7 for a spacer layer is sandwiched between this recording stacked layer 2 on a substrate 1 and a Ni stamper 6 in which a concavo-convex pattern such as a pit and a groove for a second layer are formed while removing beforehand a protection sheet attached at least at one side to sheet 7 for dust or damage prevention, and the Ni stamper 6 and the sheet 7 for the spacer layer are separated after passing the Ni stamper 6 and the sheet 7 between two heating and/or pressure rollers 8 at the speed of 0.2 m/min. In addition, this can be separated into two steps. For example, the sheet 7 for a spacer layer is stacked on the first recording stacked layer, the sheet 7 for a spacer layer is passed between two heating and/or pressure rollers 8 at the speed of 0.2 m/min, and the protection sheet attached for dust or damage prevention at least at one side is removed. Next, the Ni stamper 6 in which a concavo-convex pattern such as a pit and a groove for the second recording stacked layer are formed, and the substrate 1 where the above-described spacer layer is bonded are stacked, and the Ni stamper 6 and substrate 1 are passed between two heating and/or pressure rollers 8 at the speed of 0.2 m/min. The Ni stamper is set beforehand in the holder having a heating function with heating temperature of 120° C. to 170° C., and the temperature of the Ni stamper is 90° C. to 130° C. The sheet for a spacer layer becomes soft by touching the warm Ni stamper, and the transcription is enhanced because the resin can be easily filled in each concavity of the pattern. In addition, since the stripping from the stamper becomes smooth if the stripping is performed in the state that the sheet is soft to some extent also at the time of the stripping, the pressing and stripping are performed before the temperature of the Ni stamper falls, or the pressing and stripping are performed with controlling the temperature with the holder. Furthermore, this holder has also a mechanism raising the stamper from an outer edge of the Ni stamper with bending the stamper, and is equipped with a magnet chuck 9 for stripping. Since it is a process performed in the atmosphere, a bubble tends to arise at the time of bonding the sheet for a spacer layer. For this reason, in order to prevent the whole disk face from touching the Ni stamper at once, it is made that an end of the stamper is raised with a flexible frame, and a pressed area is gradually increased by the force of the roller being applied. Temperature control mechanisms of the heating roller and pressure roller are independent of each other. The upper and lower rollers can be at the same temperature, or the roller near the substrate side, where the first recording stacked layer is formed, and the roller near a Ni stamper side can be also at different temperatures. Speed can also be adjusted arbitrarily, and the heating roller and pressure roller can be also independently provided. That is, one is the heating roller, and another is the pressure roller. The desirable material of a roller surface is soft material such as rubber so that a plastic substrate such as polycarbonate material may not be damaged. A desirable range of the surface temperature of the heating roller is a range from 35° C., which is higher than room temperature, to 175° C. at which soft material such as rubber does not deteriorate so as to use a resin which does not become soft at the room temperature as sheet material. The surface temperature of the heating roller is measured with a thermocouple.

In addition, the passing speed of the disk changes with the rotation speed of the roller. A desirable range of the passing speed of the disk is from 0.1 m/min to 3 m/min. Since thermal conduction velocity from the heating roller changes with the thermal conductivity and thickness of the sheet material, there is optimal passing speed. When a plastic substrate is used, it has low thermal conductivity and is weak in heating, and hence, it is not possible to make the temperature of the heating roller high. For this reason, the passing speed was made late at 0.2 m/min at 70° C. that was low temperature not causing deforming. A preferable temperature range was from 60° C. to 95° C. Since a metal stamper such as a Ni stamper is heated beforehand by the holder that has a heating function, the rotational speed of the heating roller can be made more quickly than 0.2 m/min. UV light was radiated on a pattern side transferred after being stripped from the Ni stamper. The thermoplastic resin becomes soft by the heating roller, and is simultaneously pressed by the pressure roller. Since the resin becomes cured when the temperature of the resin falls, pattern deformation by the stripping does not arise. Stripping was also easy. Since the stamper is removed before the spacer layer is completely cured, it is possible to prevent a crack and degradation of transfer from arising due to stress. However, since thermal resistance is low as it is, curing becomes perfect by performing UV light emission. After curing completely, even if multiple rewrite was performed to the recording stacked layer, stability equivalent to a polycarbonate substrate was obtained. A metal halide lamp was used for UV light emission. A low-pressure mercury lamp or a high-pressure mercury vapor lamp can be also used. Since UV transmissions of both the first recording stacked layer 2 and Ni stamper 6 are low, UV light emission is performed after stripping the Ni stamper as described above.

The used sheet for a spacer layer was made by mixing photo-curing organic material and thermoplastic organic material at the weight ratio of 1:1. An acrylic resin (DVDOO3N made by Nippon Kayaku Co., Ltd.) including a photopolymerization initiator was used as the photo-curing organic material, and a phenoxy resin (a reagent made by Aldrich Corp.) was used for the thermoplastic resin. As other material besides this, for example, a polyvinyl acetate resin, a vinyl butyral resin, an acrylic resin, an epoxy resin, a polyvinyl chloride, a vinyl chloride copolymer, polyvinyl alcohol, a cyano acrylic ester system, a nitrocellulose system, polyynebutylene, polyvinyl ether, acrylic ester, polyvinyl pyrrolidone, polyolefine, polypropylene, nylon, polytetrafluoroethylene, etc. are mentioned as the thermoplastic resins. Other photo-curing organic material comprises, for example, a resin and a cationic initiator, and as examples of this type of resins, a cycloaliphatic epoxy resin, a bisphenol A type epoxy resin, a bisphenol F type epoxy resin, a phenol novolak type epoxy resin, a vinyl ether compound, etc. are mentioned, and as cationic initiators, aromatic diazonium salt, aromatic sulfonium salt, aromatic iodonium salt, and a metallocene compound etc. are mentioned. The cationic initiator is mixed at 0.01 to 10% to the resin. In addition, when a photopolymerization initiator is mixed as a photo-curing organic material, for example, benzoin, benzoin butyl ether, benzoin isopropyl ether, benzophenone, benzaldehyde, benzyl, benzoin ethyl ether, benzyl dimethyl ketal, xanthone, thio-xanthone, azobisisobutyronitril, benzoyl peroxide, a benzophenone/amine system, and photopolymerization initiators (photochemical sensitizers) commonly known are mentioned. The photopolymerization initiator is mixed at 0.1 to 5% to the resin. It is further preferable to select material, having an increasing system of a molecular weight by polymerization by light or heat after pattern transfer, as the thermoplastic organic material, because hardness increases. In photo-curing organic material, there are cationic polymerization type material that gradually performs curing reaction when UV light is radiated, and material is cured during or immediately after light radiation. When a reaction rate is slow, light irradiating is performed before pattern transfer to a second layer, and when a reaction rate is fast, light irradiating is performed after pattern transfer.

In addition, when a softening degree of thermoplastic organic material is larger than that of photo-curing organic material, the sheet is formed so that a content of thermoplastic organic material in a side far from the substrate, that is, a Ni stamper side may be larger than that in a side near the substrate. That is, this is better since faithful transfer can be performed by filling the details of the Ni stamper with a softened portion by increasing the content of the thermoplastic organic material in a Ni stamper side. On the contrary, when a softening degree of photo-curing organic material is larger than that of thermoplastic organic material, it is made that a content of thermoplastic organic material in a side near the substrate is larger than that in a side far from the substrate. That is, this is better since faithful transfer can be performed by filling the details of the stamper pattern with a softened photo-curing organic material in the Ni stamper side.

When photo-curing organic material and thermoplastic organic material softened by heating are mixed, the fundamental geometry, i.e., thickness, of a resin layer is maintained by the photo-curing organic material when the resin layer is heated, and the thermoplastic organic material distributed inside the resin layer in a granular or braided shape is softened, and hence, it becomes faithful to transfer the concavo-convex pattern of the stamper since the thermoplastic organic material fills the details of the stamper pattern. Since the internal stress of thermoplastic resin is small, its curing contraction is small, and hence, not only there is hardly an influence to a sputter film, but also there is no geometric change from immediately after pattern transfer. When being made to completely cured by optical curing, the photo-curing organic material is stabilized thermally without remelting, and excels in the resistance to the heat by the laser beam.

In addition, the above-described sheet is not limited to the configuration by only the resin made by mixing the photo-curing organic material and thermoplastic organic material, but can be also formed thinly on a sheet-like transparent base. If a resin is applied beforehand to the desired thickness from several $\mu$m to dozens $\mu$m on the sheet-like transparent base uniformly, the sheet can be formed in sufficient precision. In order to use this for a transparent layer of a multi-layer recording medium, it is desirable that transparent base has high transmission in the wavelength (for example, 405 nm) of a laser beam, and hence, polycarbonate or polyolefine is suitable. Since the sheet is used for a transparent layer of a multi-layer recording medium, a laser beam passes through a cover layer and goes back and forth the first recording stacked layer and second recording stacked layer. Hence, it is desirable that the refraction indices of the above-described resin and the above-described sheet-like transparent base are about the same. This is because reflection by the difference between refraction indices exerts a bad influence.

Since recording density is determined in general by light beam spot size on a disk and the spot size is proportional to wavelength/NA, it is indispensable to high densification to shorten wavelength and to increase NA. Nevertheless, since the coma aberration generated by a disk inclination becomes large in proportion to the third power of NA, a margin to the disk inclination becomes very small due to high NA, and hence, a beam becomes blurry due to slant inclination. In order to solve this, the thickness of a substrate or a cover layer to which light is incident is made thin to make aberration to a slope angle as small as possible.

Figure 5:
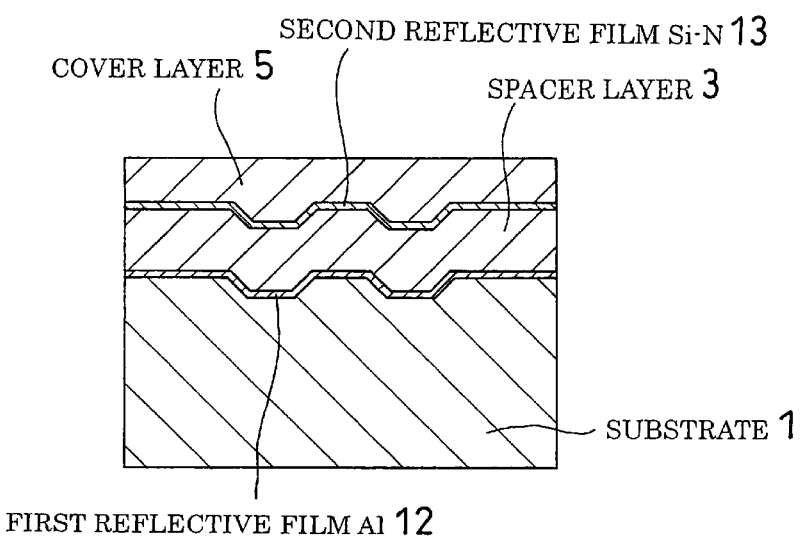
FIG. 5 is a structural diagram of a two-layer read-only recording medium according to an embodiment of the present invention.
Figure 6:
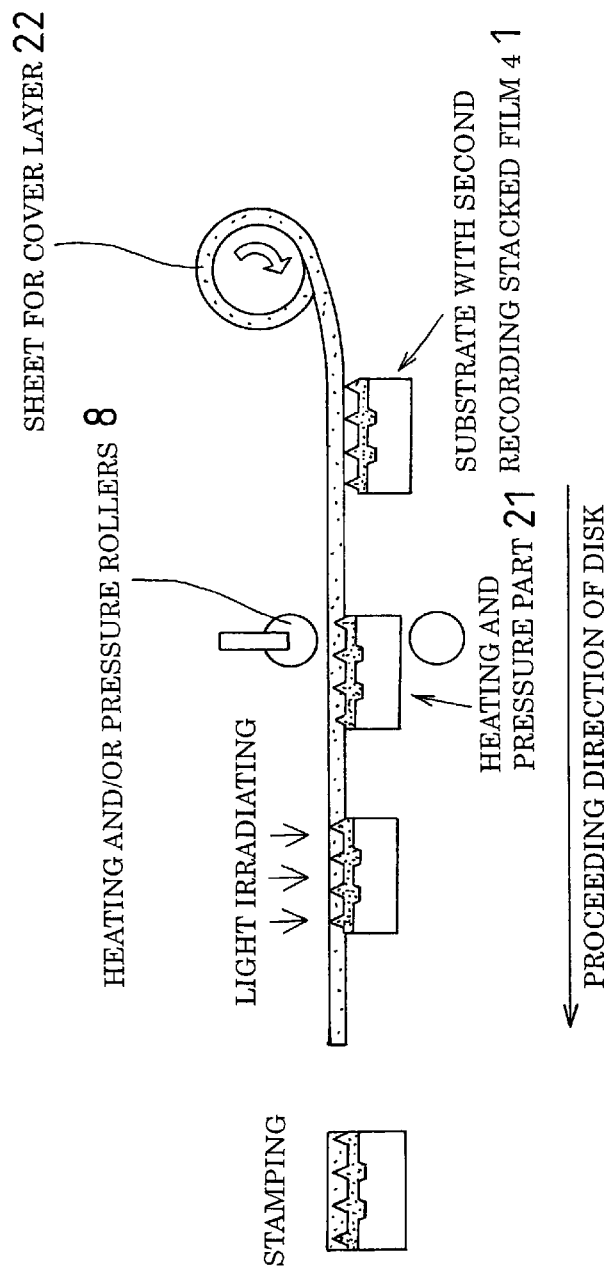
FIG. 6 shows a production method of a cover layer of a multi-layer recording medium according to an embodiment of the present invention.
Figure 7:
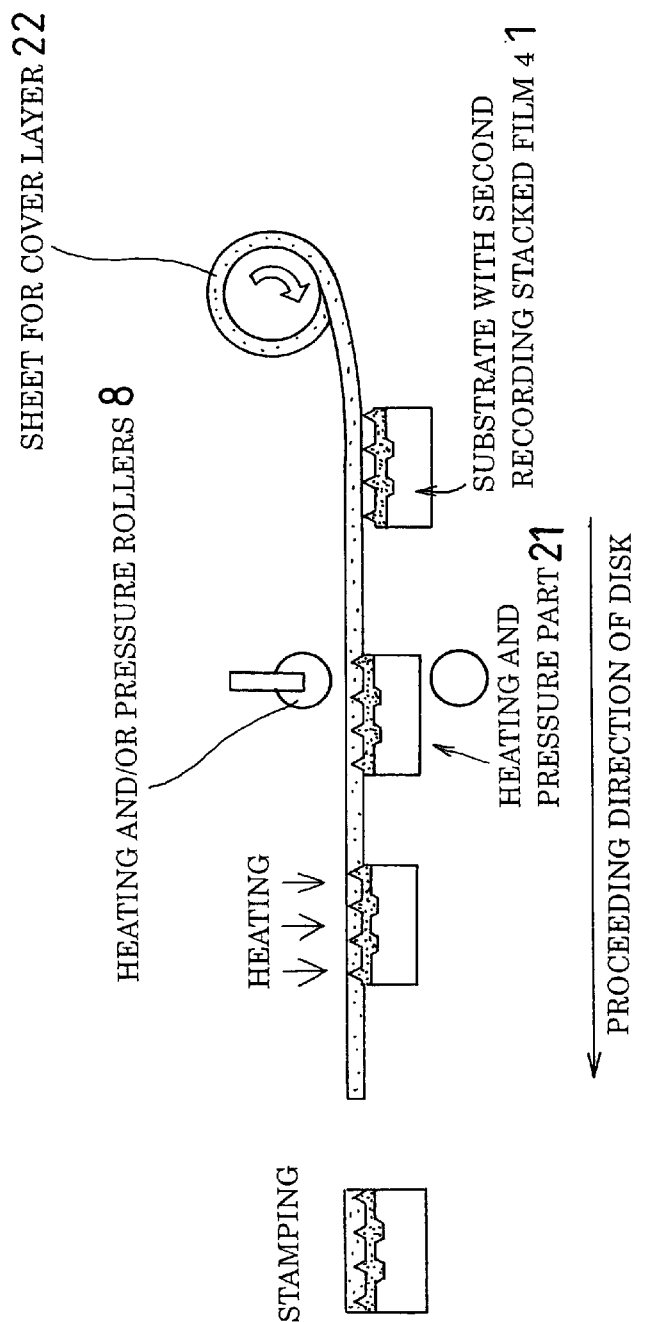
FIG. 7 shows a production method of a cover layer of a multi-layer recording medium according to another embodiment of the present invention.
Figure 8:
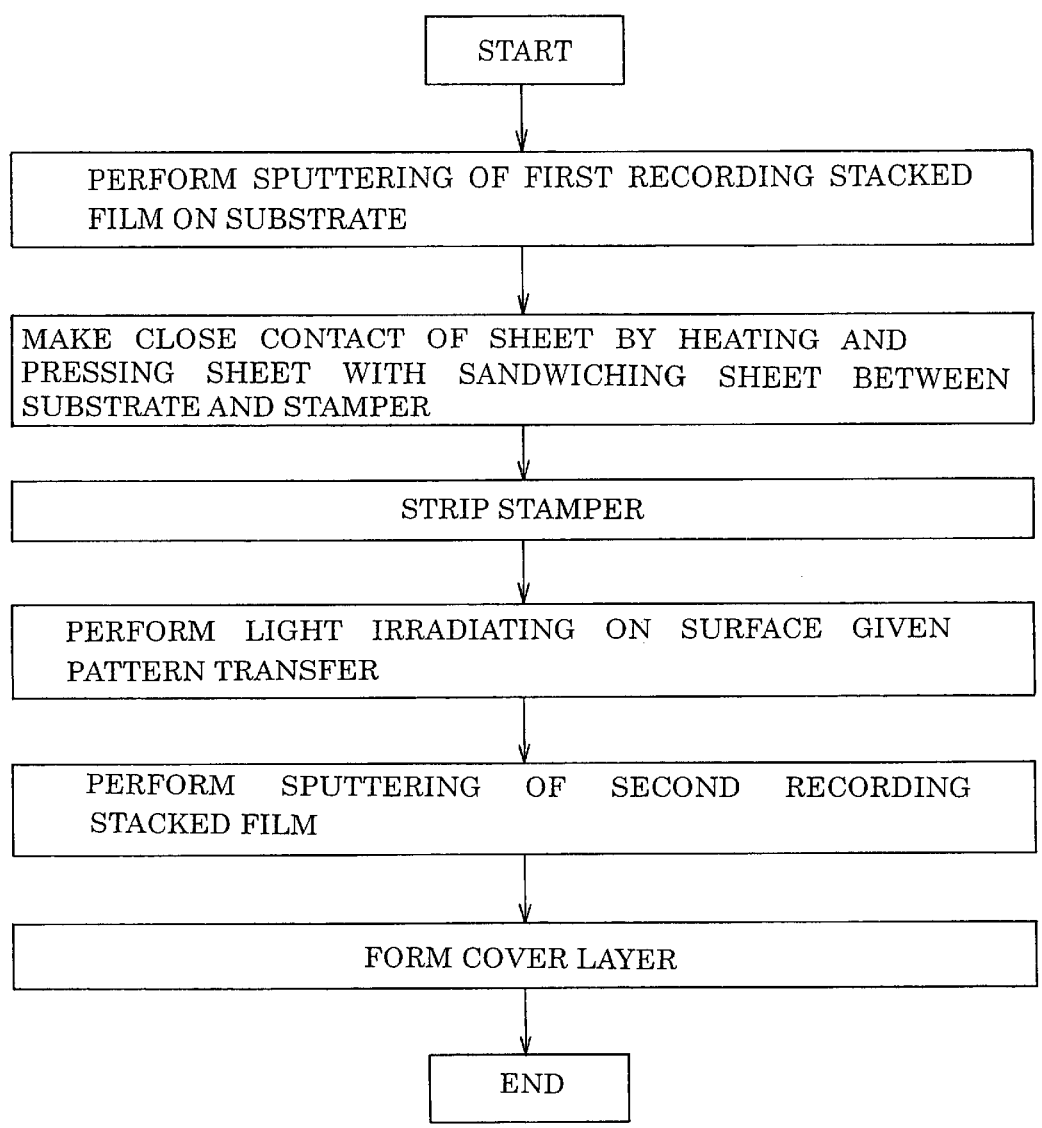
FIG. 8 is a process flow chart according to an embodiment of the present invention.
Figure 9:
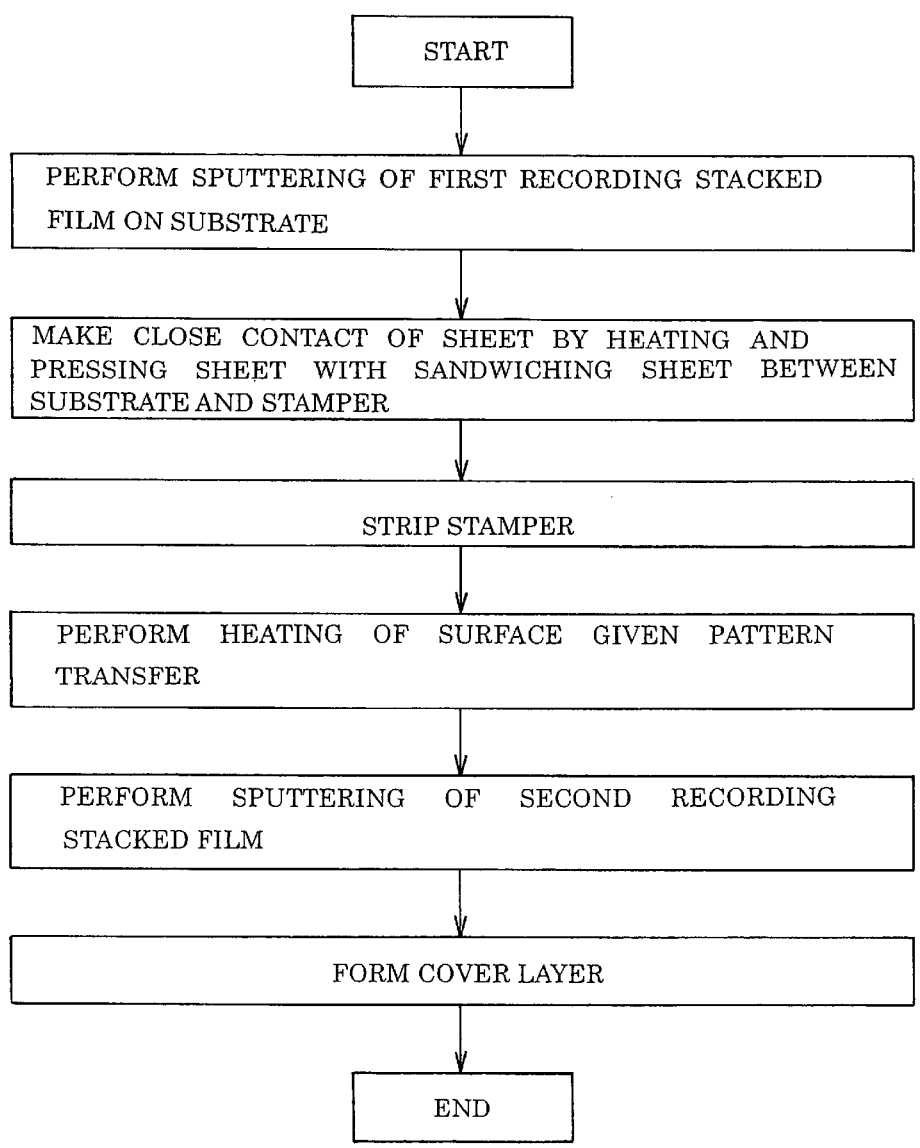
FIG. 9 is a process flow chart according to another embodiment of the present invention.
Figure 10:
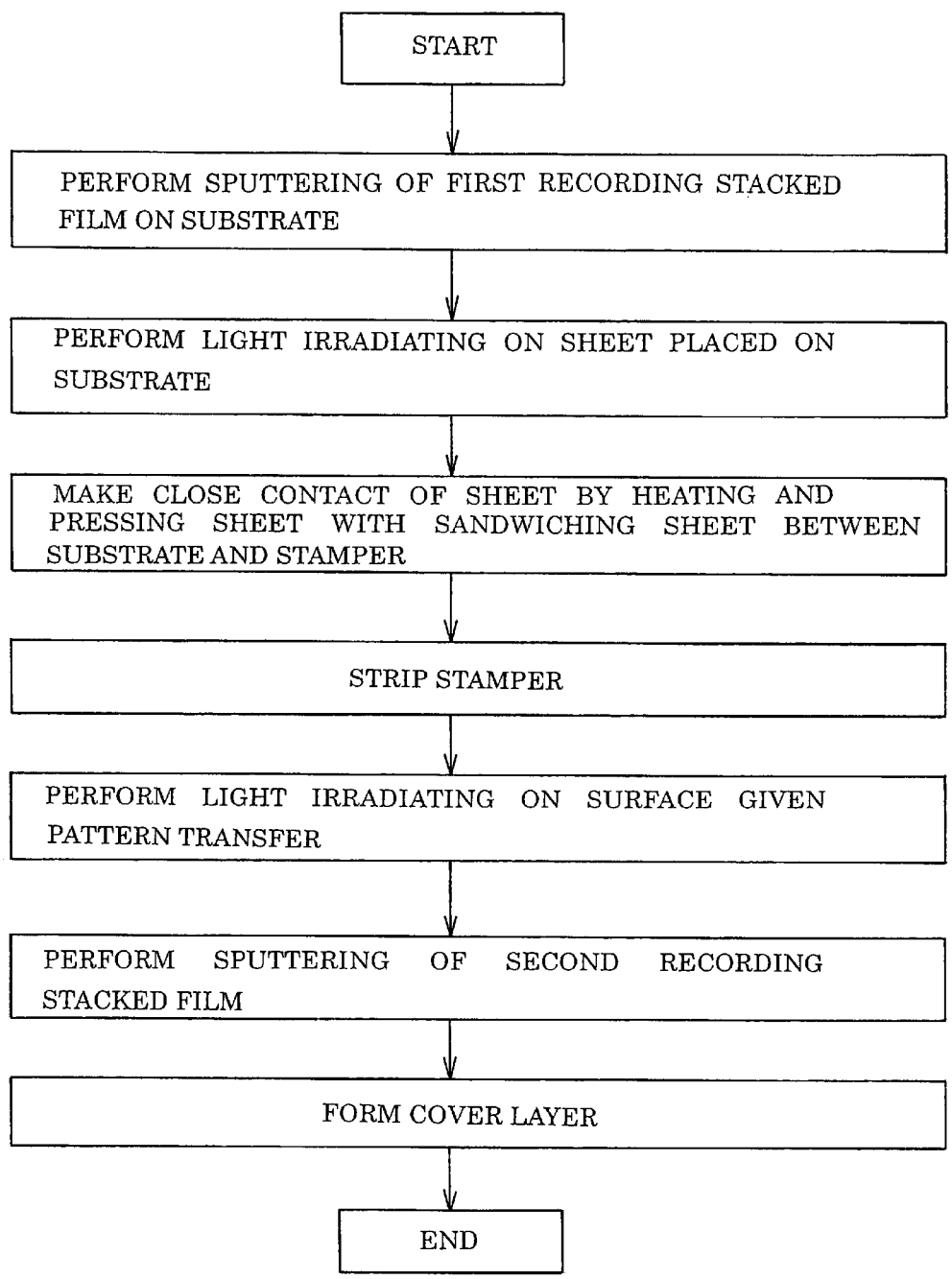
FIG. 10 is a process flow chart according to still another embodiment of the present invention.

After completely curing the spacer layer where the pattern was transferred, the second recording stacked layer was stacked by sputtering. Then, as shown in FIG. 5, the cover layer of 90 $\mu$m thick was formed on the second recording stacked layer. Since a laser beam passes the cover layer, the high transmission at the wavelength of about 400 nm is required, and hence, polycarbonate is used as main material. Polyolefine is preferable in order to increase signal efficiency furthermore. There are two kinds of configurations of the cover layer as follows. One is that (1) photo-curing organic material and thermoplastic organic material, (2) thermosetting organic material and thermoplastic organic material, or (3) photo-curing organic material and thermosoftening and thermosetting organic material are formed on a sheet such as a polycarbonate sheet, and another is formed with (1) photo-curing organic material and thermoplastic organic material, (2) thermosetting organic material and thermoplastic organic material, or (3) photo-curing organic material and thermosoftening and thermosetting organic material, which are material of the spacer layer. The processing comprised the steps of stacking the substrate 1, where layers to the second recording stacked layer 4 were formed, and the sheet 22 for a cover layer with an adhesive layer, passing them between the two heating and/or pressure rollers 8 that are mentioned above, thereafter performing light irradiating on the cover layer, including the photo-curing organic material, as shown in FIG. 6, and heating the cover layer, including the thermosetting organic material, as shown in FIG. 7.

It is desirable that a protection sheet for preventing dust and a damage is attached at least on each side of the sheet for a spacer layer and the sheet for a cover layer.

Recording on the first recording stacked layer of the recording medium that was obtained in this manner was performed under conditions that NA was 0.85, laser wavelength was 405 nm, a track pitch was 0.32 $\mu$m, groove width was 0.18 $\mu$m, and mark length was 0.18 $\mu$m. Since the spacer layer was uniform, there was little optical spot deformation, and hence, a jitter value was 8.8%. In addition, since the transcription was also good, necessary and sufficient values of noise and a tracking error signal could be obtained. This is effective means under the conditions that track pitch is 0.4 $\mu$m or less, groove width is 0.25 $\mu$m or less, and mark length is 0.25 $\mu$m or less.

The thickness of a spacer layer and the transcription at the time of changing the mixing ratio of photo-curing organic material and thermoplastic organic material will be shown below. The thickness of a spacer layer shows the dispersion in a range of 20 mm to 58 mm in the radius of a $\phi$120-mm substrate, and the transcription shows the jitter of a preformat part that was transferred.

Table 1 shows the relation between the mixing ratio of photo-curing organic material and thermoplastic organic material, and the thickness distribution or jitter. As seen from Table 1, it is desirable that the mixing ratio of photo-curing organic material and thermoplastic organic material is from 2:8 to 8:2.

TABLE 1

| Mixing Ratio of Photoresistive Organic Material and Thermoplastic Organic Material | Distribution of Thickness | Jitter (%) |
| --- | --- | --- |
| 0:10 | 20 ± 5 | 8.2 |
| 2:8 | 20 ± 1 | 8.2 |
| 5:5 | 22 ± 1 | 8.2 |
| 8:2 | 22 ± 1 | 8.2 |
| 10:0 | 22 ± 1 | 10.0 |

[Embodiment 2]

Figure 3:
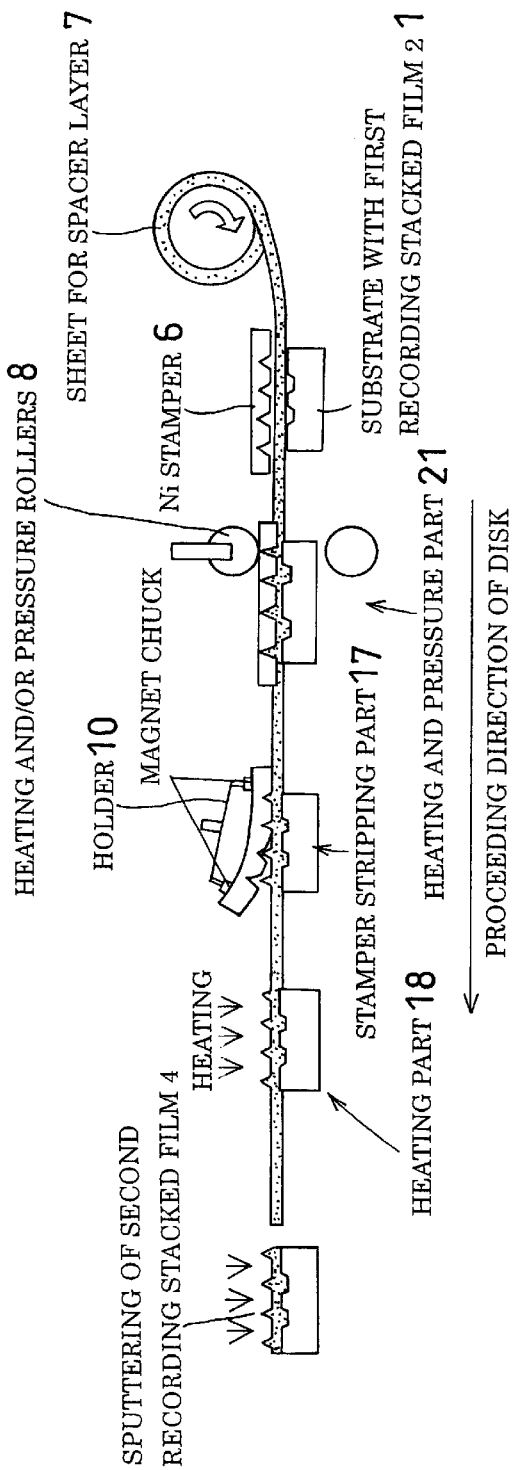
FIG. 3 shows a production method of a spacer layer of a two-layer recording medium according to another embodiment of the present invention.

A production method of a multi-layer rewritable recording medium will be described, the multi-layer rewritable recording medium where a sheet made by mixing thermosetting organic material and thermoplastic organic material at a weight ratio of 1:1 was used for a spacer layer. The epoxy resin (Denacoal EX411 made by Nagase ChemteX Corporation) was used as a thermosetting organic material, and a phenol resin (a reagent made by Aldrich) was used as a thermoplastic organic material for the spacer layer. In this case, UV light emission is unnecessary. As shown in FIG. 3, the above-described sheet is passed between heating and pressure rollers with the sheet contacting with the substrate 1, where a recording stacked layer is formed, and/or a Ni stamper. The temperature of the roller for softening the sheet at this time is 70° C. to 110° C., the temperature of the sheet is 50° C. to 90° C., the temperature of the roller for curing the sheet is 80° C. to 160° C., and the temperature of the sheet is 60° C. to 140° C. The thermoplastic resin becomes soft by the heating roller, is simultaneously filled into the details of a stamper pattern by the pressure roller, becomes cured with the fall of temperature, and since the curing reaction by heat also occurs, heat deformation does not arise after fully curing. Since it was easy to strip the stamper since the thermoplastic resin is cured with the fall of temperature, the pattern deformation at the time of stripping the stamper did not arise, but transfer was very good. In this case, since optical curing is unnecessary, an apparatus and a facility can be simplified. If stirring is adequate since both are the mixing of materials reacting to heat, it is possible to obtain a hard spacer layer that is excellent in shock resistance and has high density. So long as the reaction is adequate, the time-dependent change of the spacer layer is little, there is no influence to transmission, adhesive property, etc., and hence it is possible to maintain a stable state.

As for thermosetting organic material and thermoplastic organic material, for example, the same material described in the first embodiment can be used as the thermoplastic organic material, and for example, phenol, resorcinol, phenol resorcinol, urea, polyester, polyisocyanate, a silicone resin, acrylic, acrylic acid diester, melamine, etc. are mentioned as the thermosetting organic material. In addition, mixtures of respective polyvinyl acetal, polyvinyl butyral, polyvinyl formal, nylon, neoprene, etc. to respective phenolic resins, and mixtures of respective cationic initiators to these respective resins are mentioned. The cationic initiator is mixed at 0.01 to 10 wt % to the resin. It is preferable to select material, having an increasing system of a molecular weight by polymerization by light or heat after pattern transfer, as the thermoplastic organic material, because hardness further increases.

After completely curing the spacer layer where the pattern was transferred, the second recording stacked layer was stacked by sputtering. Then, as shown in FIG. 5, the cover layer of 90 $\mu$m thick was formed on the second recording stacked layer. Since a laser beam passes the cover layer, the high transmission at the wavelength of about 400 nm is required, and hence, polycarbonate is used as main material. Polyolefine is preferable in order to increase signal efficiency furthermore. There are two kinds of configurations of the cover layer as follows. One is that (1) photo-curing organic material and thermoplastic organic material, (2) thermosetting organic material and thermoplastic organic material, or (3) photo-curing organic material and thermosoftening and thermosetting organic material are formed on a sheet such as a polycarbonate sheet, and another is formed with (1) photo-curing organic material and thermoplastic organic material, (2) thermosetting organic material and thermoplastic organic material, or (3) photo-curing organic material and thermosoftening and thermosetting organic material, which are material of the spacer layer. The processing comprised the steps of stacking the substrate 1, where layers to the second recording stacked layer 4 were formed, and the sheet 22 for a cover layer with an adhesive layer, passing them between the two heating and/or pressure rollers 8 that are mentioned above, thereafter performing light irradiating on the cover layer, including the photo-curing organic material, as shown in FIG. 6, and heating the cover layer, including the thermosetting organic material, as shown in FIG. 7.

It is desirable that a protection sheet for preventing dust and a damage is attached at least on each side of the sheet for a spacer layer and the sheet for a cover layer.

Recording on the first recording stacked layer of the recording medium that was obtained in this manner was performed under conditions that NA was 0.85, laser wavelength was 405 nm, a track pitch was 0.32 $\mu$m, groove width was 0.18 $\mu$m, and mark length was 0.18 $\mu$m. Since the spacer layer was uniform, there was little optical spot deformation, and hence, a jitter value was 8.8%. In addition, since the transcription was also good, necessary and sufficient values of noise and a tracking error signal could be obtained. This is effective means under the conditions that track pitch is 0.4 µm or less, groove width is 0.25 µm or less, and mark length is 0.25 µm or less.

The thickness and transcription of a spacer layer at the time of changing the mixing ratio of thermosetting organic material and thermoplastic organic material will be shown below. The thickness of a spacer layer shows the dispersion in a range of 20 mm to 58 mm in the radius of a φ120-mm substrate, and the transcription shows the jitter of a preformat part that was transferred.

Table 2 shows the relation between the mixing ratio of thermosetting organic material and thermoplastic organic material, and the thickness distribution or jitter. As seen from Table 2, it is desirable that the mixing ratio of thermosetting organic material and thermoplastic organic material is from 2:8 to 8:2.

TABLE 2

| Mixing Ratio of Thermosetting Organic Material and Thermoplastic Organic Material | Distribution of Thickness | Jitter (%) |
| --- | --- | --- |
| 0:10 | 22 ± 1 | 11.0 |
| 2:8 | 22 ± 1 | 8.2 |
| 5:5 | 22 ± 1 | 8.2 |
| 8:2 | 22 ± 1 | 8.2 |
| 10:0 | 22 ± 1 | 10.0 |

[Embodiment 3]

Figure 4:
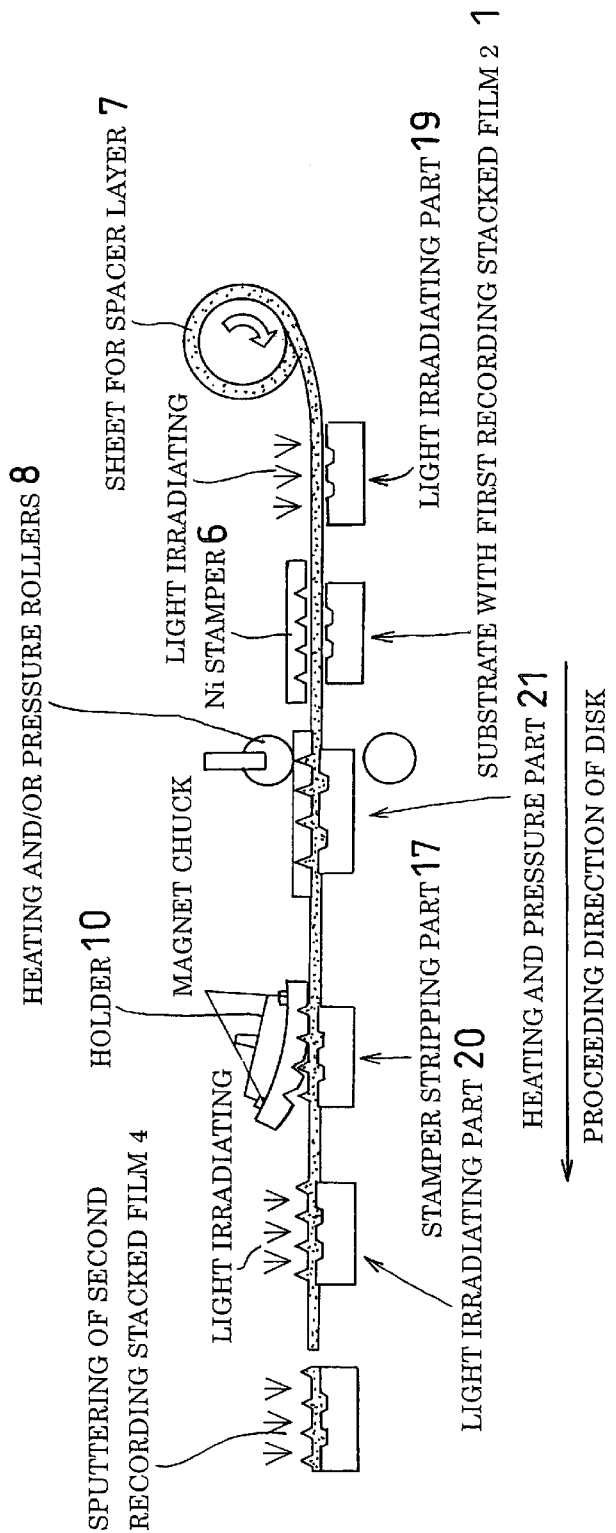
FIG. 4 shows a production method of a spacer layer of a two-layer recording medium according to still another embodiment of the present invention.

A production method of a multi-layer rewritable recording medium will be described, the multi-layer rewritable recording medium where a sheet made by mixing photo-curing organic material and thermosoftening-then-setting organic material, whose molecular weight is different from that of the photo-curing organic material by a range of 50 to 100 times, at a weight ratio of 1:1 was used for a spacer layer. A mixture of an acrylic resin with a photopolymerization initiator (DVD003N made by Nippon Kayaku Co., Ltd.), whose concentration was 0.1 to 5 wt % to the resin, was used as the photo-curing organic material, and an epoxy resin (Denacoal EX411 made by Nagase ChemteX Corporation) was used as the thermosoftening-then-setting organic material. In this case also, curing reaction occurs by UV light irradiation like the first embodiment. Although the thermosoftening-then-setting resin is excellent in thermal stability after curing, since high reaction temperature becomes a process problem, it is more preferable that a reaction efficiency is enhanced by mixing a photo-curing component. As shown in FIG. 4, after radiating UV light of 500 mJ/cm² beforehand before closely contacting the above-described sheet to the substrate 1, where the first recording stacked layer was formed, and/or Ni stamper, the sheet was passed at the passing speed of 0.2 m/min between heating and/or pressure rollers 8 after about 5 seconds. Here, as for a first temperature at which the thermosoftening-then-setting resin is softened, the temperature of the roller is 50° C. to 80° C., and the temperature of the sheet is 40° C. to 60° C. As for a second temperature for curing, the temperature of the roller is 80° C. to 160° C., and the temperature of the sheet is 60° C. to 140° C. Since the thermosoftening-then-setting resin has high reaction temperature, it is provided to promote thermal reaction by UV light emission so as to easily occur, by mixing a photo-curing resin. When temperature increased with the heating roller, reaction gradually progressed, and simultaneously, the thermosoftening-then-setting resin that became soft was filled over the details of a stamper pattern by the pressure roller. The sheet was stripped from the Ni stamper after about 5 minutes. Since it was easy to strip the Ni stamper since the resin is cured, the pattern deformation did not arise, but transfer was very good. Since time until the resin being cured changes with a mixing ratio of the photo-curing organic material and the thermosoftening-then-setting organic material, faithful transfer can be performed by adjusting the time of stripping the Ni stamper. Since a degree of hardness increases with passage of time after UV light emission, it is good to pass the sheet between the heating and/or pressure rollers 8 within 3 minutes from immediately after UV light emission. The transcription becomes bad since curing progresses too much if it passes over 3 minutes. If UV light emission is again performed on the pattern surface after stripping from the Ni stamper, still more perfect curing is obtained.

As for the used sheet made by mixing the photo-curing organic material and the thermosoftening-then-setting organic material, the same material as the thermosetting organic material descried in the second embodiment can be used as the thermosoftening-then-setting organic material, and the same material as the material described in the first embodiment can be used as the photo-curing organic material. Since the sheet is cured with cross-linking with a thermal-reacting component by mixing a photo-curing component, contraction stress is distributed, and hence, there is hardly influence on a sputter film. In addition, since cross-linking with a reactive group that a thermoplastic and thermosetting component has is performed, Tg can be enhanced and absorptivity can be made low. It means to be strong in heat that Tg is high, and it is an effect leading to the improvement in a life of a sputter film that absorptivity is low.

After completely curing the spacer layer where the pattern was transferred, the second recording stacked layer was stacked by sputtering. Then, as shown in FIG. 5, the cover layer of 90 µm thick was formed on the second recording stacked layer. Since a laser beam passes the cover layer, the high transmission at the wave length of about 400 nm is required, and hence, polycarbonate is used as main material. Polyolefine is preferable in order to increase signal efficiency furthermore. There are two kinds of configurations of the cover layer as follows. One is that (1) photo-curing organic material and thermoplastic organic material, (2) thermosetting organic material and thermoplastic organic material, or (3) photo-curing organic material and thermosoftening-then-setting organic material are formed on a sheet such as a polycarbonate sheet, and another is formed with (1) photo-curing organic material and thermoplastic organic material, (2) thermosetting organic material and thermoplastic organic material, or (3) photo-curing organic material and thermosoftening-then-setting organic material, which are material of the spacer layer. The processing comprised the steps of stacking the substrate 1, where layers to the second recording stacked layer 4 were formed, and the sheet 22 for a cover layer with an adhesive layer, passing them between the two heating and/or pressure rollers 8 that are mentioned above, thereafter performing light irradiating on the cover layer, including the photo-curing organic material, as shown in FIG. 6, and heating the cover layer, including the thermosetting organic material, as shown in FIG. 7.

It is desirable that a protection sheet for preventing dust and a damage is attached at least on each side of the sheet for a spacer layer and the sheet for a cover layer.

Recording on the first recording stacked layer of the recording medium that was obtained in this manner was performed under conditions that NA was 0.85, laser wavelength was 405 nm, a track pitch was 0.32 μm, groove width was 0.18 μm, and mark length was 0.18 μm. Since the spacer layer was uniform, there was little optical spot deformation, and hence, a jitter value was 8.8%. In addition, since the transcription was also good, necessary and sufficient values of noise and a tracking error signal could be obtained. This is effective means under the conditions that track pitch is 0.4 μm or less, groove width is 0.25 μm or less, and mark length is 0.25 μm or less.

The thickness and transcription of the spacer layer in the case of changing the mixing ratio of the photo-curing organic material and the thermosoftening and thermosetting organic material, whose molecular weight differs from the photo-curing organic material will be shown below. The thickness of the spacer layer shows the dispersion in a range of 20 mm to 58 mm in the radius of a φ120-mm substrate, and the transcription shows the jitter of a preformat part that is transferred.

Table 3 shows the relation between the mixing ratio of photo-curing organic material and the thermoplastic and thermosetting organic material, and the thickness distribution or jitter. As seen from Table 3, it is desirable that the mixing ratio of photo-curing organic material, and thermosoftening and thermosetting organic material is from 2:8 to 8:2.

TABLE 3

| Mixing Ratio of Photoresistive Organic Material and Thermosoftening and Thermosetting Organic material | Distribution of Thickness | Jitter (%) |
| --- | --- | --- |
| 0:10 | 22 ± 5 | 8.2 |
| 2:8 | 22 ± 1 | 8.2 |
| 5:5 | 22 ± 1 | 8.2 |
| 8:2 | 22 ± 1 | 8.2 |
| 10:0 | 22 ± 1 | 11.0 |

The first recording stacked layer used in the first to third embodiments is constituted by AgPdCu (80 nm), $(ZnS)_{80}(SiO_2)_{20}$ (120 nm), $Ge_5Sb_2Te_8$ (10 nm), and $(ZnS)_{80}(SiO_2)_{20}$ (110 nm) in order of sputtering, and the second recording stacked layer is constituted by $(ZnS)_{80}(SiO_2)_{20}$ (120 nm), $Ge_5Sb_2Te_8$ (6 nm), and $(ZnS)_{80}(SiO_2)_{20}$ (110 nm) in order of sputtering.

Figure 11:
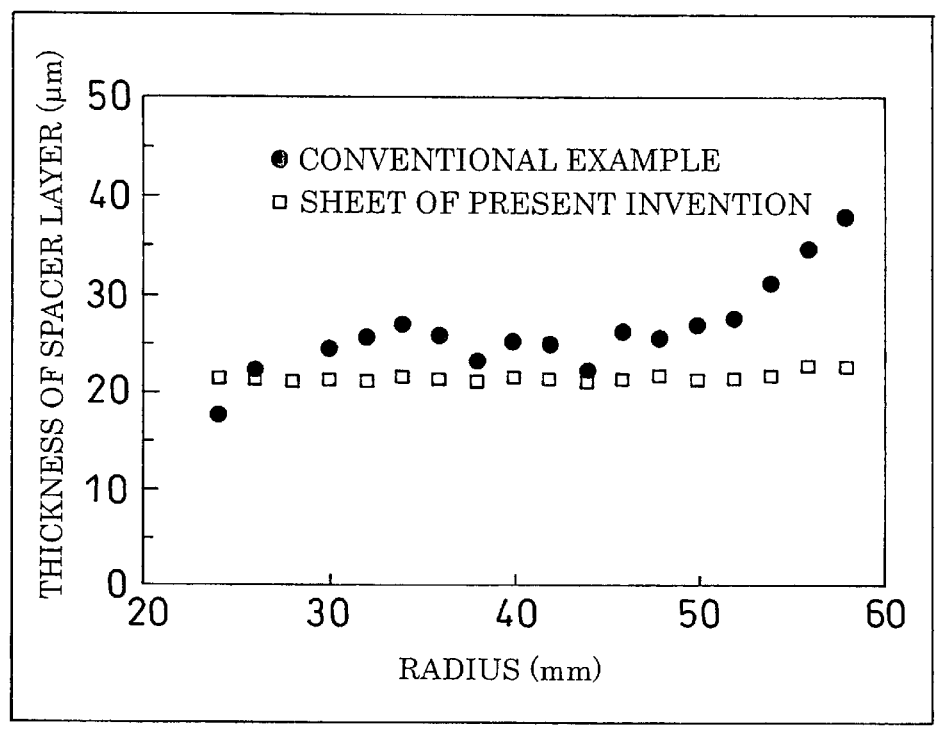
FIG. 11 is a comparison graph of thickness of spacer layer distribution.
Figure 12:
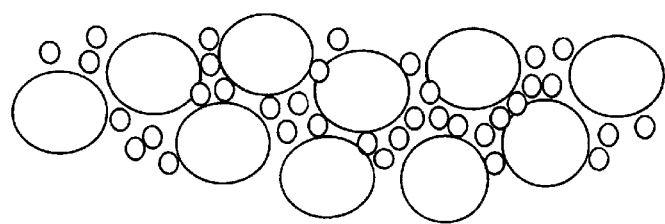
FIG. 12 is a schematic diagram of molecular weight of a sheet agent according to an embodiment of the present invention.

By using the sheet used in the first to third embodiments, pattern transfer was good without depending on the light transmission of the first recording stacked layer, and it was possible to obtain the multi-layer recording medium in good productivity. According to the measurements of thickness of the spacer layer in the first to third embodiments, the spacer layer could be formed uniformly within 22±1 μm in a range of radius of 20 mm to 58 mm. FIG. 11 shows the thickness of a spacer layer distribution map of the sheet in JP-A-8-297861, which is a conventional example, and the sheet in the present invention.

Owing to these, it was succeeded to experimentally produce a recording medium for a super-mass optical disk digital videocassette recorder with a capacity of 40 GB or more.

[Embodiment 4]

A multi-layer read-only recording medium was produced at the same steps as those in the first embodiment. An example of its configuration is shown in FIG. 5. The used sheet for a spacer layer was made by mixing photo-curing organic material and thermoplastic organic material at the weight ratio of 1:1. In photo-curing organic material, there are cationic polymerization type material that gradually performs curing reaction when UV light is radiated, and material is cured immediately after light is radiated. When a reaction rate is slow, UV light emission is performed before pattern transfer to a second layer, and when a reaction rate is fast, UV light emission is performed after pattern transfer. As described above, the thermoplastic resin becomes soft by the heating roller, is simultaneously filled into the details of a stamper pattern by the pressure roller, and becomes cured with the fall of temperature. Hence, heat deformation at the time of stripping the stamper does not arise. However, since the sheet softens when heat is again applied as it is, it is possible to obtain the multi-layer medium, which is excellent in the transcription and thermal resistance, by radiating UV light to completely cure the sheet. Actually-used resins are the same as those mentioned in the first embodiment.

A first reflective film is Al (80 nm), and a second reflective film is Si—N (50 nm).

[Embodiment 5]

A multi-layer read-only recording medium was produced at the same steps as those in the second embodiment. The used sheet for a spacer layer was made by mixing thermosetting organic material and thermoplastic organic material at the weight ratio of 1:1. In this case, UV light emission is unnecessary. The Ni stamper and substrate 1 are passed between heating and pressure rollers with the Ni stamper and substrate 1 closely contacting. As described above, the thermoplastic resin becomes soft by the heating roller, is simultaneously filled into the details of a stamper pattern by the pressure roller, and becomes cured with the fall of temperature, and since the curing reaction by heat also occurs, heat deformation does not arise after fully curing. Since the thermoplastic resin is cured with the fall of temperature, the pattern deformation at the time of stripping the stamper did not arise, but transfer was very good. Actually-used resins are the same as those mentioned in the second embodiment.

A first reflective film is Al (80 nm), and a second reflective film is Si—N (50 nm).

[Embodiment 6]

A multi-layer read-only recording medium was produced at the same steps as those in the third embodiment. A sheet made by mixing photo-curing organic material and thermosoftening and thermosetting organic material, whose molecular weight is different from that of the photo-curing organic material by a range of 50 to 100 times, at a weight ratio of 1:1 was used for a spacer layer. Although the thermosoftening and thermosetting resin is excellent in thermal stability after curing, since high reaction temperature becomes a process problem, a reaction efficiency is enhanced by mixing a photo-curing component. After radiating UV light beforehand before closely contacting the above-described sheet to the substrate 1, where the recording stacked layer was formed, and/or Ni stamper, the sheet was passed between heating and/or pressure rollers. Since the thermosetting resin has high reaction temperature, it is provided to promote thermal reaction by UV light emission so as to easily occur, by mixing a photo-curing resin. Since temperature increases with the heating roller, reaction gradually progresses. Faithful transfer can be performed by adjusting the time until the resin curing and the time of stripping the Ni stamper. The Ni stamper and substrate 1 are passed between heating and pressure rollers with sandwiching the above-described sheet. The thermosoftening and thermosetting resin became soft with the heating roller, and simultaneously, was filled over the details of a stamper pattern by the pressure roller, and curing reaction occurred by temperature. Since it was easy to strip the Ni stamper since the resin is cured, the pattern deformation did not arise, but transfer was very good. If UV light emission is again performed on the pattern surface after stripping from the Ni stamper, still more perfect curing is obtained.

As for the used sheet made by mixing the photo-curing organic material and the thermosoftening and thermosetting organic material, the same material as the thermosetting organic material descried in the second embodiment can be used as the thermosoftening and thermosetting organic material, and the same material as the material described in the first embodiment can be used as the photo-curing organic material.

A first reflective film is Al (80 nm), and a second reflective film is Si—N (50 nm).

By using the sheet used in the fourth to sixth embodiments, pattern transfer was good in the second layer, and it was possible to obtain the multi-layer read-only recording medium in good productivity. According to the measurements of thickness of the spacer layer in the fourth to sixth embodiments, the spacer layer could be formed uniformly within 22±1 μm in a range of radius of 20 mm to 58 mm.

Figure 18:
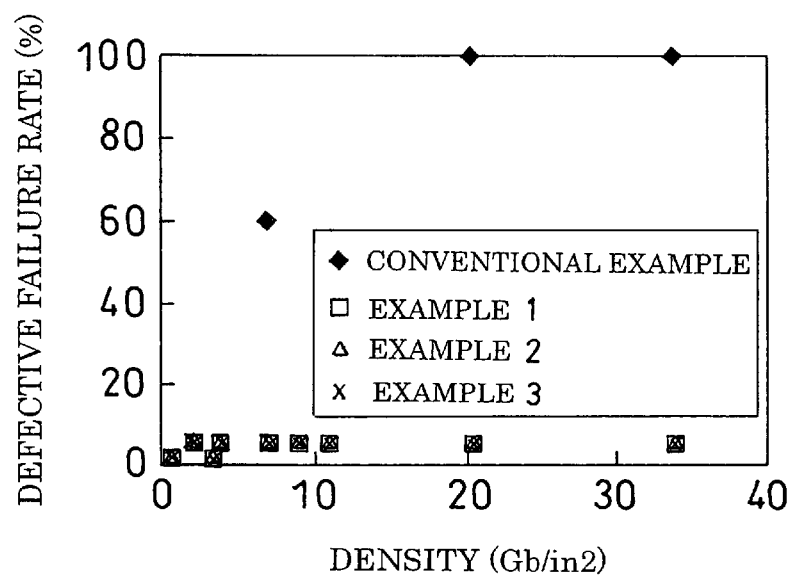
FIG. 18 is a graph showing the relation between the density and the defective failure rate.

Here, in regard to the present invention and a conventional example, the relation between the density and the defective failure rate, which is obtained from the shortest mark length and track pitch of ROM and RAM, is shown in Table 5 and FIG. 18. Although defects are hardly seen in a medium according to JP-A-8-297861 which is a conventional method when density is low, the medium can hardly correspond in the high density where multilayer is required, and hence, the defective failure rate also increases. Although an medium according to a method of the present invention is a level similar to that of the medium according to the conventional method when the density is low, the defective failure rate of the medium according to the method of the present invention increase little even if the density becomes high, and hence, it is possible to stably produce the media.

TABLE 5

|  | CD | DVD-ROM | DVD-ROM2 | DVD-RAM | DVD-RAM2 |
|---|---|---|---|---|---|
| Total Capacity (GB) | 0.64 | 4.7 | Double-sided 8.5 | 2.6 | 4.7 |
| Density (Gb/in²) | 0.6 | 3.27 | 7 | 2.09 | 3.8 |
| Defective Failure Rate (%) | 1 | 1 | 60 | 5 | 5 |
| Example 1 | 1 | 1 | 5 | 5 | 5 |
| Example 2 | 1 | 1 | 5 | 5 | 5 |
| Example 3 | 1 | 1 | 5 | 5 | 5 |

|  | HD-ROM | HD-ROM | HD-ROM |
|---|---|---|---|
| Total Capacity (GB) | Single-sided 13 | Double-sided 25 | Double-sided 45 |
| Density (Gb/in²) | 11 | 20.5 | 34 |
| Defective Failure Rate (%) | 5 | 100 | 100 |
| Example 1 | 5 | 5 | 5 |

TABLE 5-continued

| Example 2 | 5 | 5 | 5 |
| Example 3 | 5 | 5 | 5 |

In addition, it is also possible to use a transparent stamper instead of the Ni stamper used as a matrix of the pattern transfer described until now. In this case, UV transmission becomes high if UV light emission is performed from a transparent stamper side. Similarly to the case where UV light emission is used with the Ni stamper, it is good to perform UV light emission before stripping the stamper, or it is also good to perform UV light emission after stamper stripping.

Figure 14:
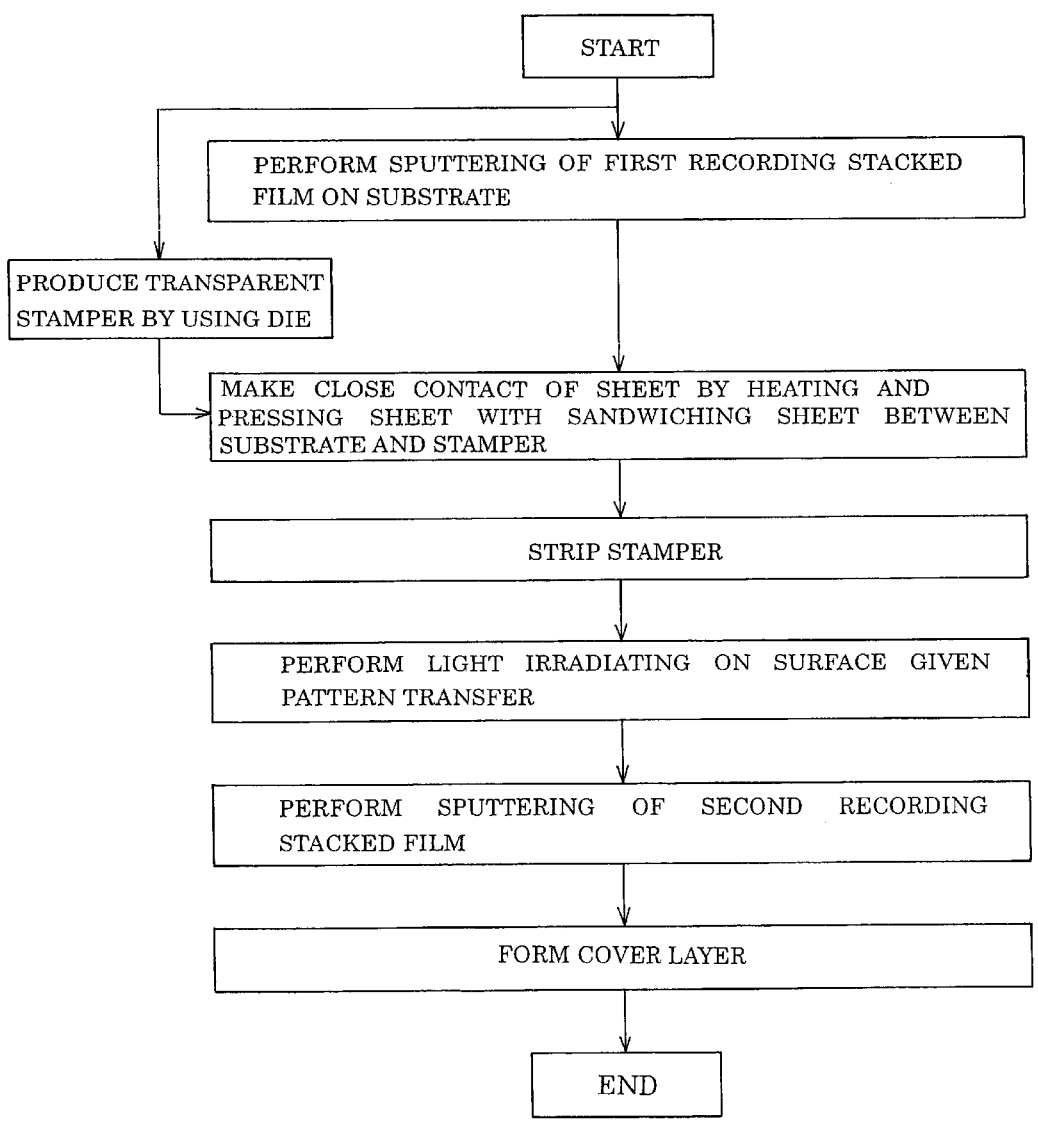
FIG. 14 is a process flow chart according to a further embodiment of the present invention.
Figure 15:
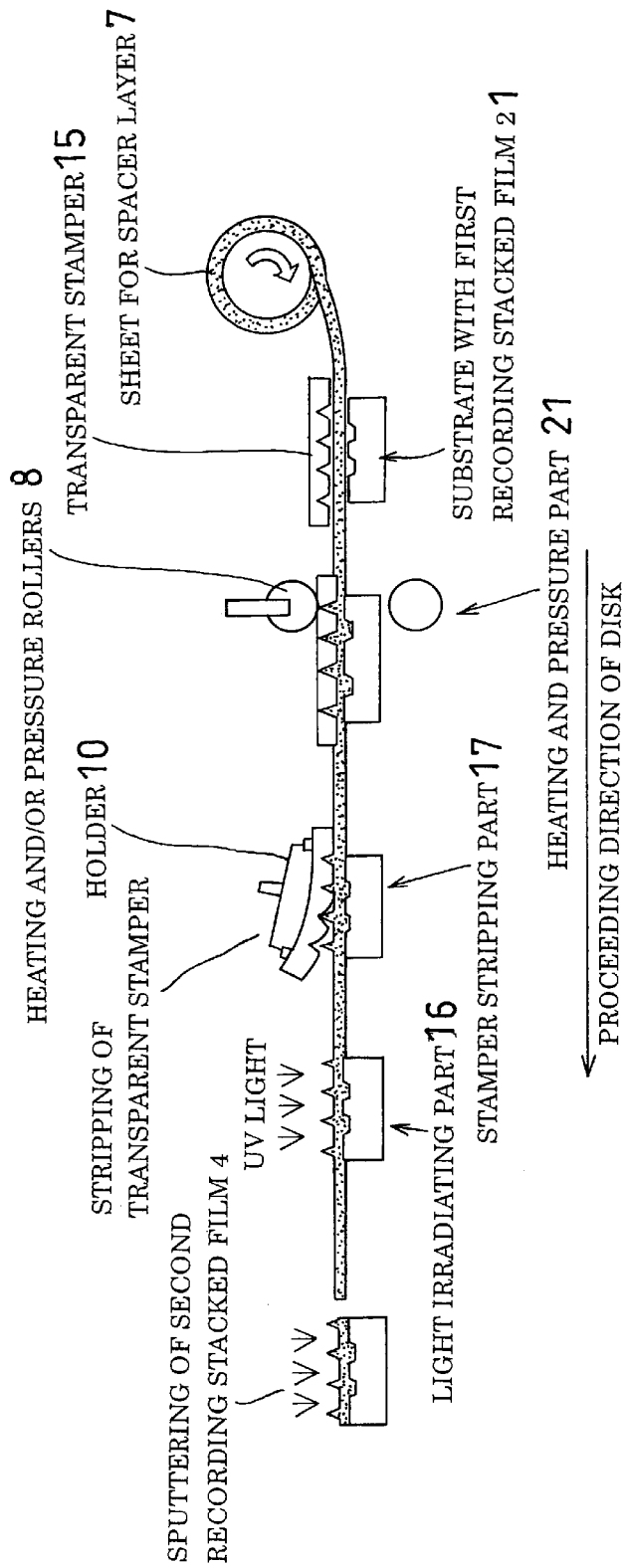
FIG. 15 shows a production method of a spacer layer of a two-layer recording medium according to a further embodiment of the present invention.
Figure 16:
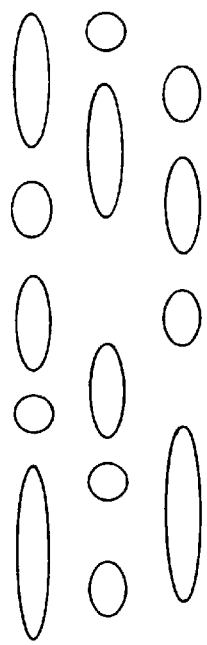
FIG. 16A is an explanatory diagram of ROM with good transcription.
FIG. 16B is an explanatory diagram of ROM with poor transcription.
Figure 16:
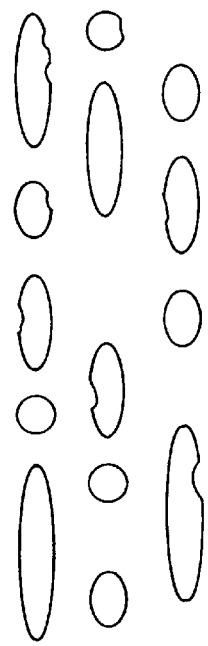
Figure 17:
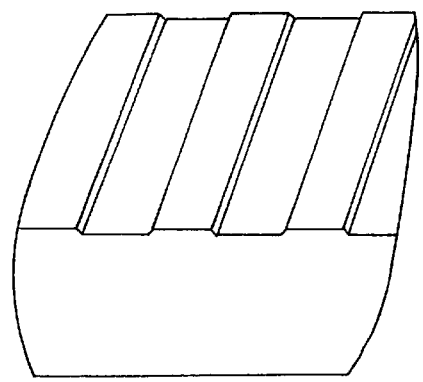
FIG. 17A is an explanatory diagram of RAM with good transcription.
FIG. 17B is an explanatory diagram of RAM with poor transcription.
Figure 17:
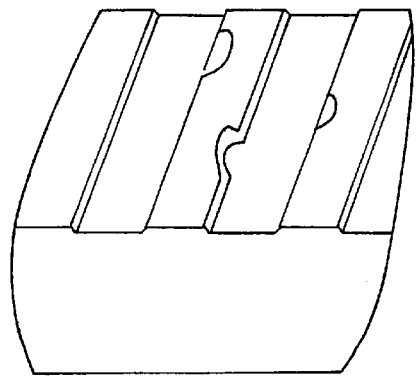

An example of a manufacture method of the transparent stamper will be described. A Ni stamper is produced by the steps of Ni evaporation coating and Ni plating from a resist original disk in which a concavo-convex pattern such as a pit and a groove is formed. A transparent stamper on whose surface a concavo-convex pattern is reproduced is completed by injecting transparent stamper material (for example, ZEONOR1420 made by Zeon Corporation), which is dissolved at high temperature, in high pressure into a die equipped with this Ni stamper, cooling the transparent stamper material, and taking out it. This method is the same as a conventional polycarbonate substrate production method almost fundamentally only except material differing. This transparent stamper is excellent in peelability with the sheet material according to the present invention, and equivalent to the Ni stamper also in the transcription. However, since the concavo-convex pattern such as a pit and a groove is reversed with the usual Ni stamper in this case, the concavo-convex pattern is made to be a reverse spiral in the stage of the original disk beforehand depending on the use, or a mother stamper (master stamper) furthermore reversed is produced when the Ni stamper is produced from the original disk. Since it is better because of sufficient heat conduction from the heating roller and easy stripping that the thickness of the transparent stamper is thin, it is preferable that the thickness is in the range of 0.1 mm to 0.6 mm. Since this is not used as a substrate, there is no reaction of retardation and the like by making the substrate thin. The production procedure in this case is shown in FIGS. 14 and 15.

An example will be cited about the influence on optical property by the difference between refraction indices of a resin for a sheet and a transparent base when the resin for a sheet described above is formed on the transparent base. In the multi-layer recording medium of this embodiment, the unevenness ΔR of reflectance of the second recording stacked layer 7 in a crystallized state was measured by using the resins for sheets having different refraction indices n. Reflectance unevenness ΔR is defined as ΔR=Rmax−Rmin. Rmax is the maximum value of the reflectance within a disk surface and Rmin is the minimum value of the reflectance within the disk surface. The refraction index of a transparent base was 1.53.

The relation between the refraction index of the resins for sheets, and Δn or ΔR is shown in Table 4. As shown in Table 4, if the difference Δn between the refraction indices of the transparent base and resins for sheets becomes large, an optical interference causes reflectance unevenness, and hence, an error rate at the time of reproduction becomes large. Hence, it was found that, in order to reproduce a signal without making an error at the time of record and reproduction, it is preferable that the square of the difference Δn between the refraction indices of the transparent base and the resin for a sheet is 1/150 or less. Since the high-speed record and reproduction that exceeds 10 m/s can be also performed, it is more preferable that the square of the difference Δn between the refraction indices of the transparent base and the resin for a sheet is 1/1000 or less.

TABLE 4

| Refractive Index of Resin for Sheet | Difference Δn between Refractive Indices of Transparent Base and Resin for Sheet | Square of Δn | ΔR (%) |
|---|---|---|---|
| 1.53 | 0.00 | 0 | 0.0 |
| 1.54 | 0.01 | 0.0001 | 0.6 |
| 1.55 | 0.02 | 0.0004 | 1.2 |
| 1.56 | 0.03 | 0.0009 | 1.6 |
| 1.58 | 0.05 | 0.0025 | 2.7 |
| 1.60 | 0.07 | 0.0048 | 3.5 |
| 1.61 | 0.08 | 0.0064 | 4.2 |

Figure 13:
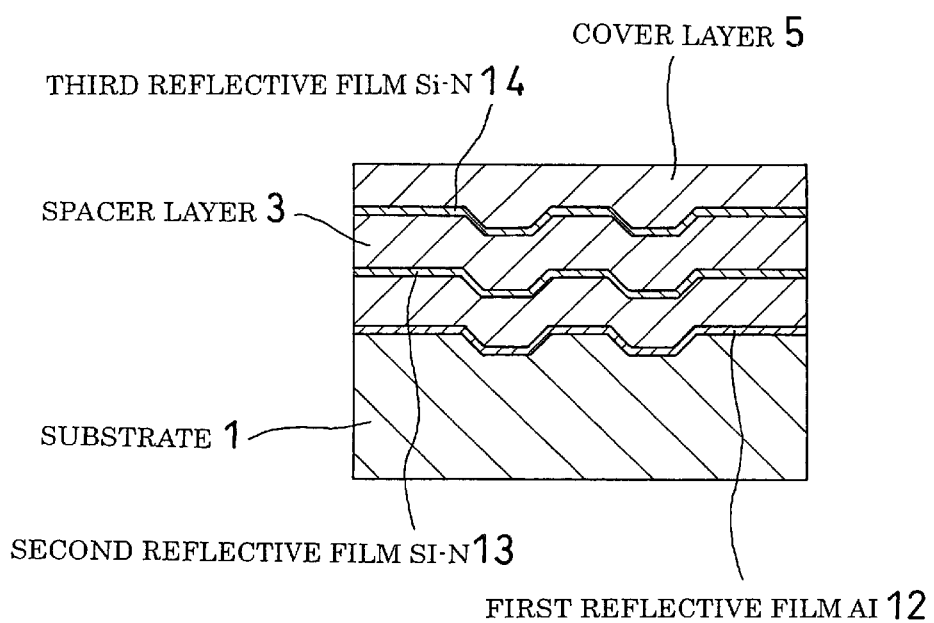
FIG. 13 is a structural diagram of a three-layer read-only recording medium according to an embodiment of the present invention.

Although the example of two-layer recording medium is shown in the embodiment, the process is the same also in a multi-layer read-only recording medium having three or more layer structure shown in FIG. 13. For example, similarly to the first embodiment, a pattern in the second layer is formed on the substrate where the first recording stacked layer is formed, and the second recording stacked layer is stacked by sputtering on it. After that, similarly to the pattern formation of the second embodiment, a pattern in a third layer is formed, and a third recording stacked layer is stacked by sputtering on it. Furthermore, a sheet for a cover layer thinner than the previous substrate was formed on it, and three-layer recording medium was completed. In this case, the thickness of spacer layers between the first recording stacked layer and the second recording stacked layer and between the second recording stacked layer and the third recording stacked layer was set to be 15±1 μm, and the thickness of the cover layer was set to be 85±1 μm. As for sputtered films, the first recording stacked layer was Al (80 nm), the second recording stacked layer was Si—N (50 nm), and the third recording stacked layer was Si—N (30 nm).

The first recording stacked layer of the produced multi-layer read-only recording medium was read under conditions that NA was 0.85, laser wavelength was 405 nm, track pitch was 0.35 μm, groove width was 0.20 μm, and mark length was 0.20 μm. Also in this case, since the spacer layer was uniform, there was little optical spot deformation, and hence, a jitter value was good as 8.8%. In addition, since the transcription was also good, necessary and sufficient values of noise and a tracking error signal could be obtained.

The embodiments of the present invention include the following:

(1) A production method of a recording medium, comprising:
   a step of transferring a pattern on a sheet by a stamper for pattern transfer with placing the sheet, which becomes a spacer layer and is made by mixing photo-curing organic material and thermoplastic organic material, on a substrate on which a recording film is formed, and heating and pressing them;
   a step of stripping the stamper after the transfer; and
   a step of irradiating the sheet with light after the stripping.

(2) A production method of a recording medium, comprising:
   a step of heating a sheet at a first temperature with placing the sheet, which becomes a spacer layer and is made by mixing thermosetting organic material and thermoplastic organic material, on a substrate on which a recording film is formed;
   a step of transferring a pattern on the sheet by a stamper for pattern transfer with pressing the sheet after heating at the first temperature;
   a step of heating the sheet at a second temperature higher than the first temperature after heating at the first temperature;
   a step of stripping the stamper after the heating; and
   a step of heating the sheet after the stripping.

(3) A production method of a recording medium, comprising:
   a step of irradiating a sheet with light with placing the sheet, which becomes a spacer layer and is made by mixing photo-curing organic material and thermosoftening and thermosetting organic material, on a substrate on which a recording film is formed;
   a step of heating the sheet at a first temperature after the light irradiating;
   a step of transferring a pattern on the sheet by a stamper for pattern transfer with pressing the sheet after heating at the first temperature;
   a step of heating the sheet at a second temperature higher than the first temperature after heating at the first temperature;
   a step of stripping the stamper after the pressing; and
   a step of irradiating the sheet with light after the stripping.

(4) The production method of a recording medium according to (1), wherein temperature of the heating part is between 35° C. and 175° C.

(5) The production method of a recording medium according to (2), wherein it is set that temperature of the first heating part is between 70° C. and 110° C., and temperature of the second heating part is between 80° C. and 160° C.

(6) The production method of a recording medium according to (2), wherein temperature of the first heating part is set so that temperature of the sheet may become between 50° C. and 90° C., and temperature of the second heating part is set so that the temperature of the sheet may become between 60° C. and 140° C.

(7) The production method of a recording medium according to (3), wherein it is set that temperature of the first heating part is between 50° C. and 80° C., and temperature of the second heating part is between 80° C. and 160° C.

(8) The production method of a recording medium according to (3), wherein temperature of the first heating part is set so that temperature of the sheet may become between 40° C. and 60° C., and temperature of the second heating part is set so that the temperature of the sheet may become between 60° C. and 140° C.

(9) The production method of a recording medium according to (1), wherein the photo-curing organic material is an acrylic resin including a photopolymerization initiator, and the thermoplastic organic material is a phenoxy resin.

(10) The production method of a recording medium according to (2), wherein the thermosetting organic material is an epoxy resin, and the thermoplastic organic material is a phenoxy resin.

(11) The production method of a recording medium according to (3), wherein the photo-curing organic material is an acrylic resin including a photopolymerization initiator, and the thermosoftening and thermosetting organic material is an epoxy resin.

(12) The production method of a recording medium according to (1), wherein the recording medium is a read-only recording medium.

(13) The production method of a recording medium according to (1), wherein the recording medium is a rewritable recording medium.

(14) The production method of a recording medium according to (2), wherein there is a fifty-fold to hundred-fold difference between molecular weights of the photo-curing organic material and the thermosetting organic material.

(15) The production method of a recording medium according to (1), wherein density of the recording medium is 20 Gb/in$^2$.

In a production apparatus of a recording medium according to the present invention, since a sheet used as a spacer layer of a recording medium is stripped from a stamper before the sheet is completely cured, it is possible to prevent a crack due to stress being applied, and hence it is possible to provide a recording medium with good transcription. In addition, it was achieved to obtain a production apparatus of a multi-layer rewritable recording medium and a production apparatus of a multi-layer read-only recording medium that mix photo-curing organic material and thermoplastic organic material, thermosetting organic material and thermoplastic organic material, and photo-curing organic material and thermosoftening and thermosetting organic material into each sheet used as a spacer layer respectively, and can make characteristics such as mass-productiveness, transcription, and thermal resistance effective with each production method.

What is claimed is:

1. A production apparatus of a recording medium that forms a spacer layer on a substrate on which a recording film is formed, comprising:
    a stamper for transferring a pattern on a sheet used as a spacer layer;
    a heating part that heats the sheet for transferring the pattern by the stamper;
    a pressure part that presses the sheet for transferring the pattern by the stamper;
    a stripping part that strips the stamper from the sheet; and
    a light irradiating part for irradiating light on the sheet, wherein the stripping part is between the pressure part and the light irradiating part.

2. A production apparatus of a recording medium that forms a spacer layer on a substrate on which a recording film is formed, comprising:
    a stamper for transferring a pattern on a sheet used as a spacer layer;
    a first heating part that heats the sheet for transferring the pattern by the stamper;
    a pressure part that presses the sheet for transferring the pattern by the stamper;
    a stripping part that strips the stamper from the sheet; and
    a second heating part that heats the sheet for transferring the pattern, wherein the stripping part is between the pressure part and the second heating part.

3. A production apparatus of a recording medium that forms a spacer layer on a substrate on which a recording film is formed, comprising:
    a stamper for transferring a pattern on a sheet used as a spacer layer;
    a first light irradiating part for irradiating light on the sheet;
    a first heating part that heats the sheet for transferring the pattern by the stamper;
    a pressure part that presses the sheet for transferring the pattern by the stamper;
    a stripping part that strips the stamper from the sheet; and
    a second light irradiating part for irradiating light on the sheet on which the pattern is transferred, wherein the stripping part is between the pressure part and the second light irradiating part.

4. The production apparatus of a recording medium according to claim 1, wherein the heating part and the pressure part are integrated.

5. The production apparatus of a recording medium according to claim 4, wherein what the heating part and the pressure part are integrated is a roller.

6. The production apparatus of a recording medium according to claim 1, wherein the stamper is transparent.

* * * * *